United States Patent [19]

Kuroda et al.

[11] Patent Number: 5,357,789
[45] Date of Patent: Oct. 25, 1994

[54] MISFIRE DETECTION SYSTEM FOR INTERNAL COMBUSTION ENGINE

[75] Inventors: Shigetaka Kuroda; Kazutomo Sawamura; Hiroshi Maruyama; Masayoshi Yamanaka, all of Saitama, Japan

[73] Assignee: Honda Giken Kogyo Kabushiki Kaisha, Tokyo, Japan

[21] Appl. No.: 149,570

[22] Filed: Nov. 9, 1993

[30] Foreign Application Priority Data

Nov. 10, 1992 [JP] Japan ................................ 4-326013

[51] Int. Cl.$^5$ .......................................... G01M 15/00
[52] U.S. Cl. .................................................. 73/117.3
[58] Field of Search ............... 73/116, 117.3; 324/378, 324/399; 123/676, 425; 364/431.04, 431.07, 431.08

[56] References Cited

U.S. PATENT DOCUMENTS

| | | | |
|---|---|---|---|
| 4,195,608 | 4/1980 | Sanada et al. | 123/136 |
| 4,692,092 | 9/1987 | Matsuda et al. | 415/143 |
| 4,905,658 | 3/1990 | Pfefferle | 123/670 |
| 5,193,511 | 3/1993 | Fujino | 123/520 |
| 5,216,915 | 6/1993 | Sakamoto | 73/117.3 |
| 5,263,453 | 11/1993 | Wakahara et al. | 73/117.3 |

FOREIGN PATENT DOCUMENTS

5-65866   3/1993  Japan.
5-164033  6/1993  Japan.

*Primary Examiner*—Robert Raevis
*Attorney, Agent, or Firm*—Nikaido, Marmelstein, Murray & Oram

[57] ABSTRACT

Misfire detection system for an internal combustion engine. If misfire is found to occur due to vapor lock temporarily happening, it will erroneously be judged that the structure of the engine or the fuel supply system is out of order. However, vapor lock is an interruption of the flow of fuel in a gasoline engine caused by formation of vapor or gas bubbles, and does not mean the engine or the fuel supply system is degraded in its structure. On the contrary, if misfire is detected in such situation, the misfire detection degrades the reliability of the system. The misfire detection is therefore inactivated during conditions in which vapor lock is liable to occur, by discontinuing the detection, or by deliberately deeming no misfire to occurs even if it is so detected. Alternatively, the reference level for misfire detection is raised during such conditions.

9 Claims, 8 Drawing Sheets

MISFIRE DETECTION SYSTEM FOR INTERNAL COMBUSTION ENGINE

BACKGROUND OF THE INVENTION

1. Field of the Invention

This invention relates to a misfire detection system for an internal combustion engine, and more particularly to such a system in which misfire detection is inactivated under specified operating conditions.

2. Description of the Prior Art

The cause for misfiring in an internal combustion engine may be related to either the fuel supply system or the ignition system of the engine. The assignee previously proposed a system for detecting misfire caused by the fuel supply system (Japanese Laid-Open Patent Publication No. 5(1993)-65866) and a system designed to improve misfire detection accuracy by prohibiting the making of misfire detections when engine combustion is apt to become unstable, as when the fuel injection system controls the air/fuel ratio lean, or when the fuel supply is being cut off (Japanese Laid-Open Patent Publication No. 5(1993)-164033).

In the prior art systems just mentioned, however, since the operation is monitored through information obtained from the engine itself, it is not possible to detect a situation in which vapor lock is liable to occur in the fuel supply system. When misfire is found to occur due to vapor lock temporarily happening, it will erroneously be judged, therefore that the structure of the engine or the fuel supply system is out of order. However, since vapor lock is an interruption of the flow of fuel in a gasoline engine caused by the formation of vapor or gas bubbles in the fuel supply system, this does not mean that the engine or the fuel supply system is degraded in its structure. On the contrary, the misfire detection can thus degrade the reliability of the system.

Thus, vapor lock is not caused by a fuel pressure drop due to trouble in the pressure regulator or fuel pump in the fuel supply system. For example, when during at a high altitude, both fuel temperature and in-fuel tank pressure tend to rise. Vapor lock often occurs if, during descent, the in-fuel tank pressure reaches the same level as the atmospheric pressure while the fuel temperature remains high.

SUMMARY OF THE INVENTION

This invention was accomplished in light of the foregoing circumstances and has as its object to provide a misfire detection system for an internal combustion engine which deactivates misfire detection under a condition in which vapor lock is liable to occur, thereby improving enhancing the misfire detection system's reliability.

For realizing the object, the present invention provides a system for detecting misfire for an internal combustion engine, comprising, first means for detecting whether misfire has occurred in the engine, second means for detecting a pressure in a fuel tank provided in a vehicle on which the engine is mounted, third means for detecting a temperature of the fuel supplied to the engine, fourth means for presuming, on the basis of the detected in-fuel tank pressure and the fuel temperature, if the fuel is in a condition in which vapor lock would occur, and fifth means for inactivating the operation of said first means when the fuel is presumed to be in the condition.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Embodiments of the invention will now be explained with reference to the drawings.

Figure 1:
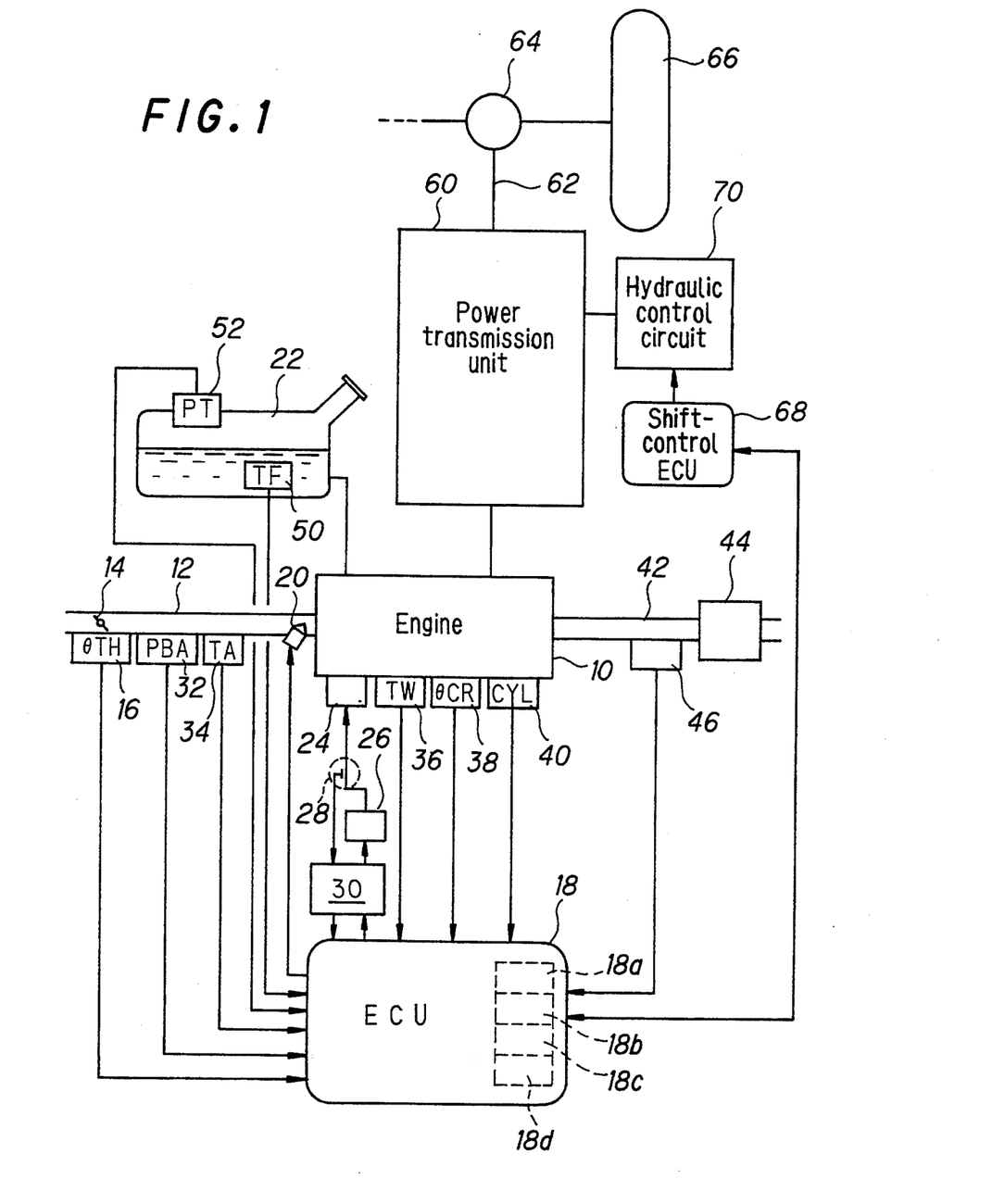
FIG. 1 is a schematic view showing the overall configuration of the misfire detection system for an internal combustion engine according to the invention.

The overall configuration of the misfire detection system for internal combustion engines according to the invention is shown schematically in FIG. 1. A throttle valve 14 is provided in an intake manifold 12 of, for example, a four cylinder engine 10. The throttle valve 14 has a throttle position sensor 16 associated therewith for outputting an electric signal representing the amount of opening of the throttle $\theta$TH to an electronic control unit, hereinafter referred to as ECU, 18.

For each cylinder, a fuel injection valve 20 is provided in the intake manifold 12 between the engine 10 and the throttle valve 14 at a point immediately upstream of an intake valve (not shown). Each fuel injection valve 20 is supplied with fuel from a fuel tank 22 via a fuel pump etc. (not shown) and is also electrically connected with the ECU 18, which supplies it with a drive signal for controlling its open time (injection time) TOUT. Spark plugs 24 associated with the respective cylinders of the engine 10 are electrically connected through an ignition distributor 26 with the ECU 18 which controls their ignition timing $\theta$IG. The lines connecting the spark plugs 24 and the ignition distributor 26 have ignition voltage sensors 28 capacitively coupled therewith so as to form multi-pF capacitors with the lines. The detection signals produced by the ignition voltage sensors 28 are forwarded to the ECU 18.

The output of a manifold absolute pressure sensor 32 installed immediately downstream of the throttle valve 14 is converted to an electric signal indicative of manifold absolute pressure PBA that is forwarded to the ECU 18. An intake air temperature sensor 34 is installed downstream of the manifold absolute pressure sensor 32 for detecting the intake air temperature TA and outputting a corresponding signal to the ECU 18.

An engine coolant temperature sensor 36 is installed in a cooling water passage (not shown) of the engine 10 for detecting the engine coolant temperature TW and outputting a corresponding signal to the ECU 18. In addition, a crankshaft sensor 38 and a camshaft position sensor 40 are installed in the vicinity of the crankshaft and camshaft (neither shown), for outputting a pulse signal $\theta$CR or CYL to the ECU 18 once every prescribed crank angle, respectively. The ECU 18 calculates the engine speed from the number of pulse signals $\theta$CR output by the crankshaft sensor and identifies from the output of the camshaft position sensor which cylinder is at a predetermined crank angular position.

The engine 10 is provided with an exhaust pipe 42 which in turn is equipped with a three-way catalytic converter 44 for purifying the exhaust gas and, upstream of the three-way catalytic converter 44, with an oxygen concentration sensor 46 for sending to the ECU 18 an output proportional to the oxygen concentration $O_2$ of the exhaust gas. The fuel tank 22 is equipped with a fuel temperature sensor 50 for detecting the fuel temperature TF and with a tank pressure sensor 52 for detecting the in-fuel tank pressure PT, the outputs of which are sent to the ECU 18.

The ECU 18, which is constituted as a microcomputer comprising an input circuit 18a for shaping, voltage level adjusting and A/D converting input signals, a CPU 18b, a memory 18c, and an output circuit 18d. The ECU 18 controls the fuel injection time TOUT and the ignition timing $\theta$IG in accordance with the operating conditions ascertained from the sensor detection values. It also determines the occurrence of misfire on the basis of input received from a misfire detection circuit 30.

A power transmission unit 60 equipped with an automatic transmission is connected to the engine 10 for converting the engine output and transmitting it to driven wheels 66 via a propeller shaft 62 and a differential 64. The power transmission unit 60 is equipped with another ECU 68 for shift control. The ECU 68 selects the gear ratio (gear position) on the basis of the vehicle speed, the throttle opening and the like, and operates a hydraulic control circuit 70 for shifting the automatic transmission to the selected gear ratio. The shift-control ECU 68 is constituted similarly to the ECU 18 and the two ECUs are able to communicate with each other via a signal line.

Figure 2:
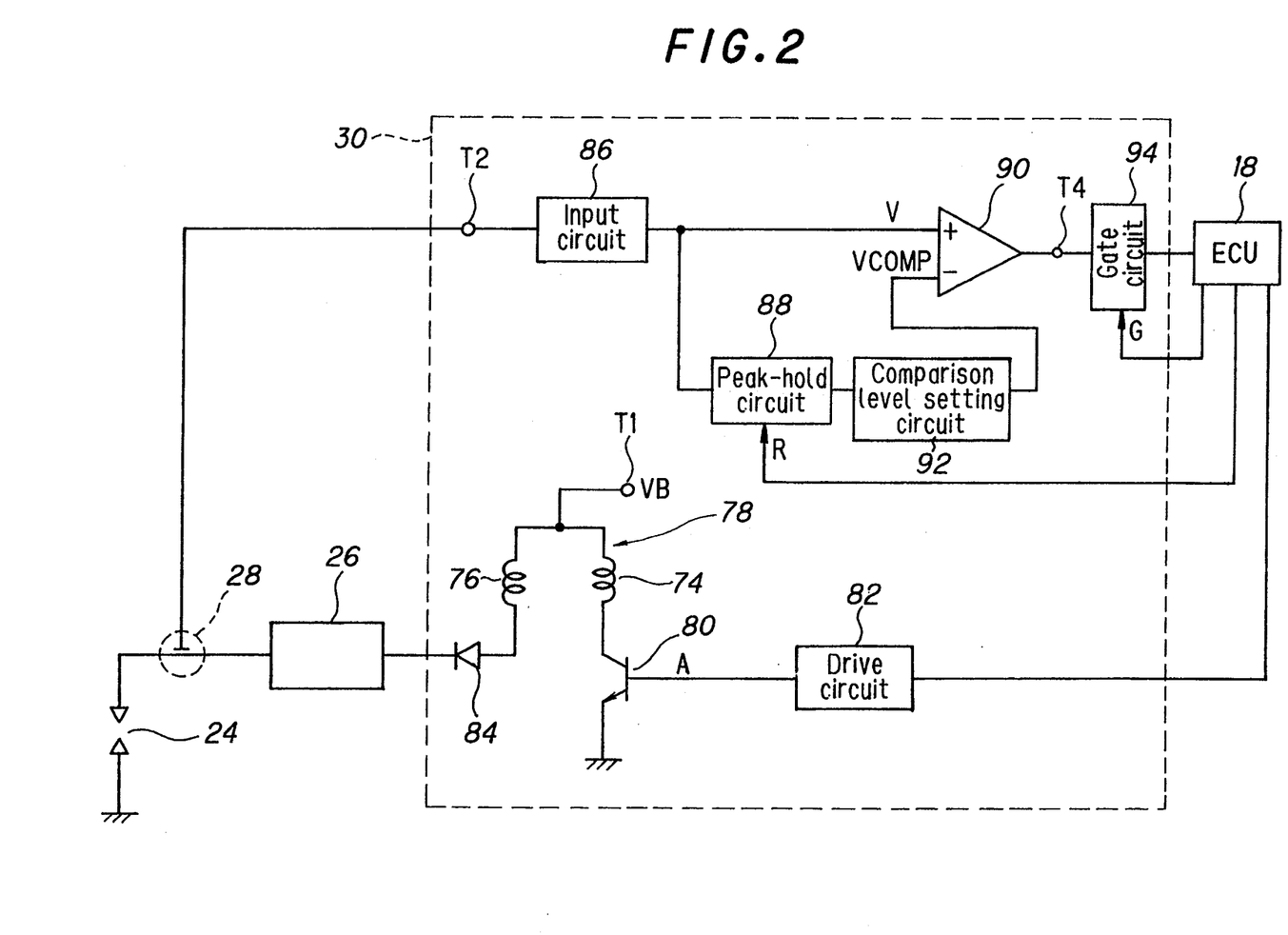
FIG. 2 is a schematic view showing the overall configuration of the misfire detection circuit illustrated in FIG. 1.

The configuration of the misfire detection circuit 30 is illustrated in detail in the block diagram of FIG. 2. A terminal T1 supplied with power source voltage VB is connected with an ignition coil 78 consisting of a primary coil 74 and a secondary coil 76. The primary coil 74 is connected with the ECU 18 through a transistor 80 and a drive circuit 82, while the secondary coil 76 is connected with the center terminal of each spark plug 24 through a diode 84 and the ignition distributor 26. At each cylinder, the ignition voltage sensor 28 mentioned above is connected with an input circuit 86 through a terminal T2, and the output of the input circuit 86 is forwarded to a peak-hold circuit 88 and the non-inverting input terminal of a comparator 90. The output of the peak-hold circuit 88 is applied to the inverting input terminal of the comparator 90 through a comparison level setting circuit 92 which produces and sends a reference value VCOMP to the terminal. The reset input terminal of the peak-hold circuit 88 is connected with the ECU 18. The output of the comparator 90 is sent to the ECU 18 through a terminal T4 and a gate circuit 94. The gate circuit 94 receives a gate signal from the ECU 18.

Figure 3:
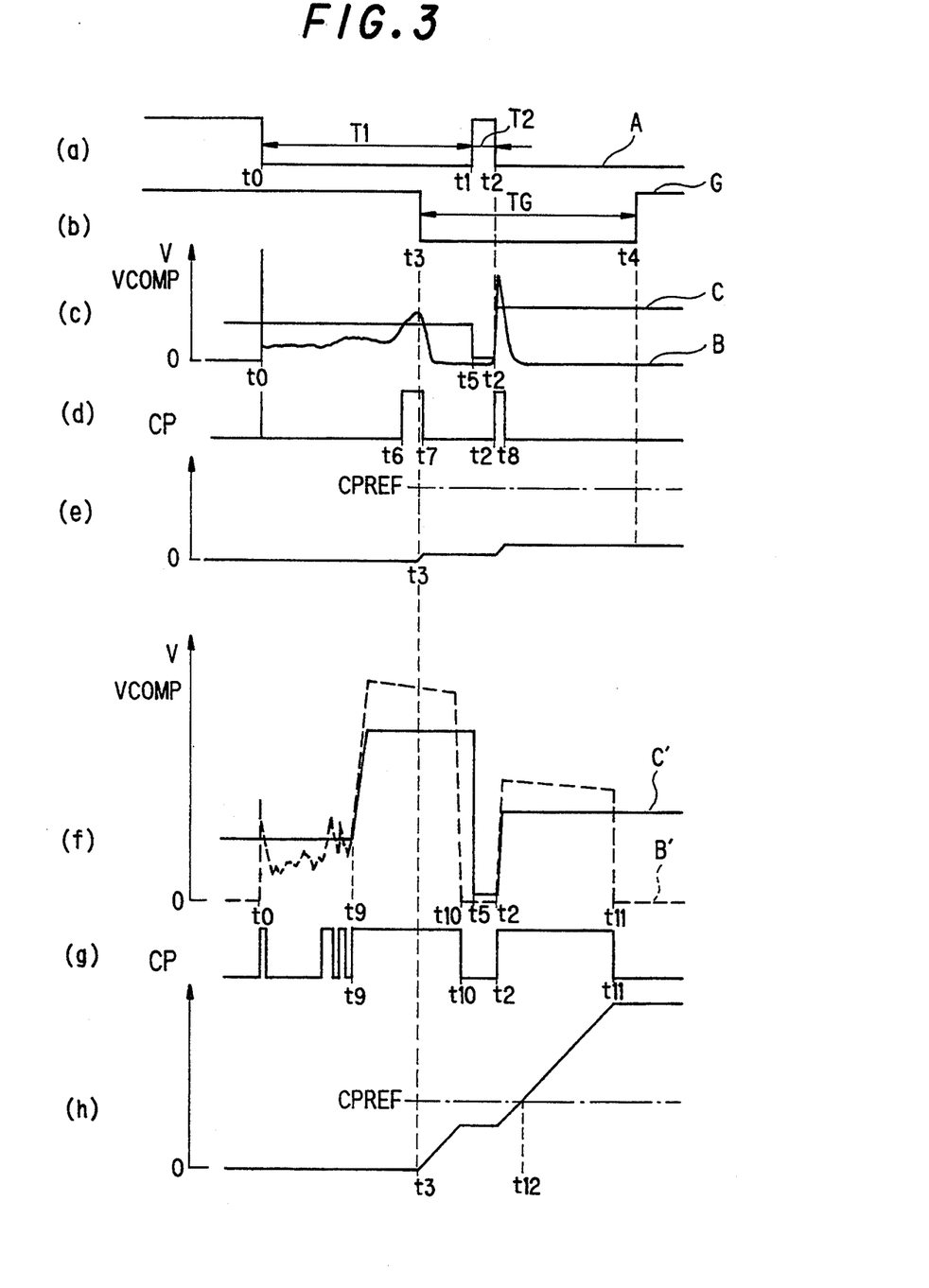
FIG. 3 is a timing chart showing the operation of the misfire detection circuit illustrated in FIG. 2.

The operation of the misfire detection circuit 30 will be briefly explained with reference to FIG. 3. In FIG. 3, (a) indicates ignition command signal A, (b) indicates gate signal G, (c) through (e) indicate the case where combustion occurs (misfire does not occur), and (f) through (h) indicate the case where combustion does not occur (misfire occurs). After an ignition command signal A has been issued at time t0, a voltage of a level not high enough to cause spark discharge is applied between the terminals of the spark plug 24 during time T2. When misfire occurs owing to a problem in the fuel supply system, the air-fuel mixture does not ionize, creating a resistance between the spark plug electrodes that is larger than when the air-fuel mixture's ionization does occur. As a result, the detection value of the ignition voltage sensor is higher than when combustion occurs. Therefore, if a value (marked as C or C' in the figure) equal to about ⅔ of the peak value of the ignition voltage (marked as B or B'), is set in the comparison level setting circuit as the reference value VCOMP for comparison with the sensor detection value B, B', the width of the output pulse CP of the comparator 90 (shown at (g)), will be larger than in the case where combustion occurs (shown at (d)). If the width of the pulse CP is integrated over the gate interval TG (from time t3 to time t4), as illustrated at (e) or (h) in the figure, and compared with another reference value CPREF, it is possible to detect whether or not combustion occurred; i.e., to detect whether or not misfire occurred. This detection is explained in detail in the assignee's Japanese Laid-Open Patent Publication 5(1993)-164033.

Based on the foregoing, an explanation of the operation of the misfire detection system of the invention will now be explained with reference to the flowchart of FIG. 4. This subroutine is activated at every TDC.

First, in S10, a check is made as to whether or not a condition prohibiting misfire detection is in effect. This subroutine is explained in FIG. 5, after which the remainder of the flowchart in FIG. 4 will be explained.

Figure 5:
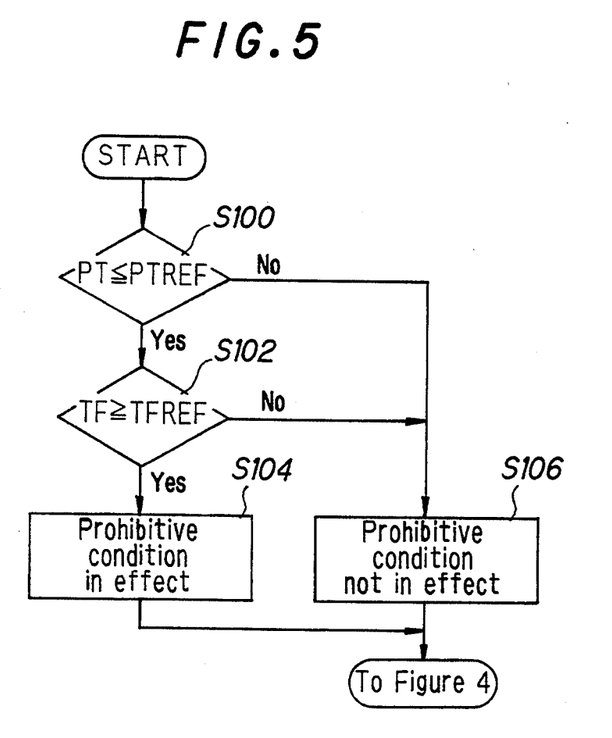
FIG. 5 is a flowchart showing a subroutine for determining a misfire detection prohibitive condition referred to in the flowchart of FIG. 4.

FIG. 5 is the flowchart of a subroutine for checking whether or not such a prohibitive condition is in effect. In S100 the detected in-fuel tank pressure PT is compared with a reference value PTREF (set to be the atmospheric pressure, for example) and if the detected value is found to be equal or less than the reference value, the program proceeds to S102. In S102 the detected fuel temperature TF is compared with a reference value TFREF (50° C., for example) and if the detected temperature is found to be equal to or greater than the reference temperature, the program proceeds to S104 in which it is determined that a prohibitive condition is in effect. If the judgment in either S100 or S102 is negative, the program proceeds to S106 in which it is determined that a prohibitive condition is not in effect.

Figure 6:
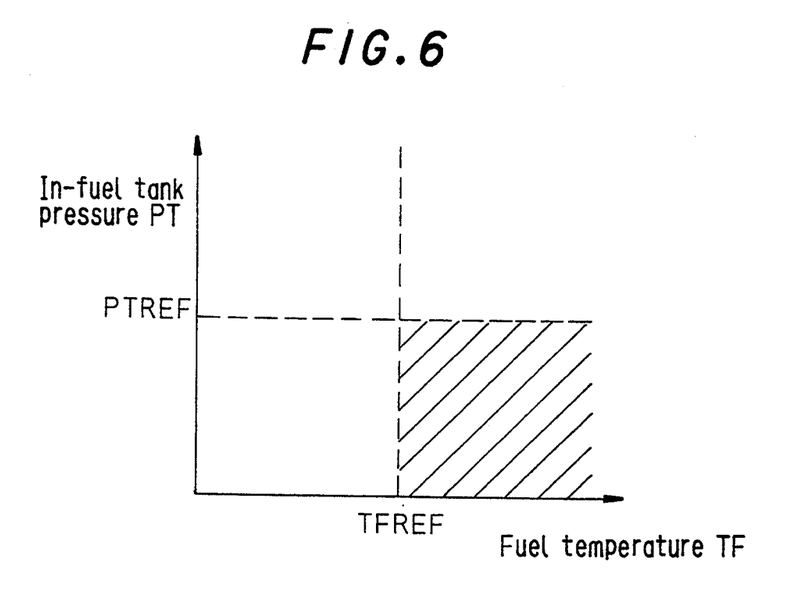
FIG. 6 is a graph showing the characteristics of reference values PTREF and TFREF referred to in the flowchart of FIG. 5.

As mentioned earlier, vapor lock is liable to occur when after driving at a high altitude where both fuel temperature and in-fuel tank pressure have risen, the vehicle descends, maintaining the high fuel temperature but allowing the in-fuel tank pressure to return to atmospheric pressure. This means that the occurrence of vapor lock may be presumed to a fair extent from the relative relationship between the fuel temperature and the in-fuel tank pressure. Accordingly, the invention is configured such that values which enables it to presume the occurrence of vapor lock have been obtained empirically and are used as the reference values PTREF, TFREF for the comparison with the detected values. FIG. 6 illustrates the characteristics of the reference values.

Returning to FIG. 4, when it is decided in S10 of the flowchart of FIG. 4 that no prohibitive condition is in effect, the program passes to S12 where a check is made as to whether or not a flag IG (which, being set to 1 by a separate subroutine simultaneously with the issuance of an ignition command signal, indicates the aforesaid time t0) is set to 1. If it is, the program proceeds to S14 in which a check is made as to whether or not the time tR (explained below) clocked by a reset timer is less than a prescribed time tRESET. If it is, the program passes to S16 in which a check is made as to whether or not a pulse (the output pulse CP of the comparator 90) is present. If the pulse is found to be present in S16, the program passes to S18 in which a counter CP for counting up the number of pulses is incremented. (This corresponds to the pulse integration mentioned above.) The program then passes to S20 in which the integrated value is compared with the reference value CPREF. If the integrated value is larger than the reference value CPREF, the program passes to S22 in which it is determined that misfire occurred. If the integrated value does not exceed the value CPREF, the program passes to S24 in which it is determined that misfire did not occur (combustion did occur).

If it is found in S10 that a prohibitive condition is in effect, the routine is immediately terminated. On the other hand, if the result in S12 is negative, the program passes to step S26 in which the time tR of the reset timer is initialized to zero. The time tR clocked by the reset timer and the prescribed time tRESET are for determining the reset timing of the peak-hold circuit 88. Specifically, when the clocked time tR becomes equal to the prescribed time tRESET, the peak-hold value is reset. Therefore, when it is found in S14 that the clocked time tR is equal to or greater than the prescribed time tRESET, the program passes to S28 in which the counter CP is set to zero, to S30 in which the flag IG is set to zero, and to S24 in which it is determined that misfire did not occur (combustion did occur).

In the embodiment under discussion, since the occurrence of vapor lock is presumed on the basis of in-fuel tank pressure and fuel temperature, and misfire detection is not conducted when such occurrence is presumed, there is no danger of misjudging that the engine or fuel supply system is out of order in its structure by detecting misfire when vapor lock may temporarily be occurring, thereby the reliability of the misfire detection system is enhanced.

Figure 4:
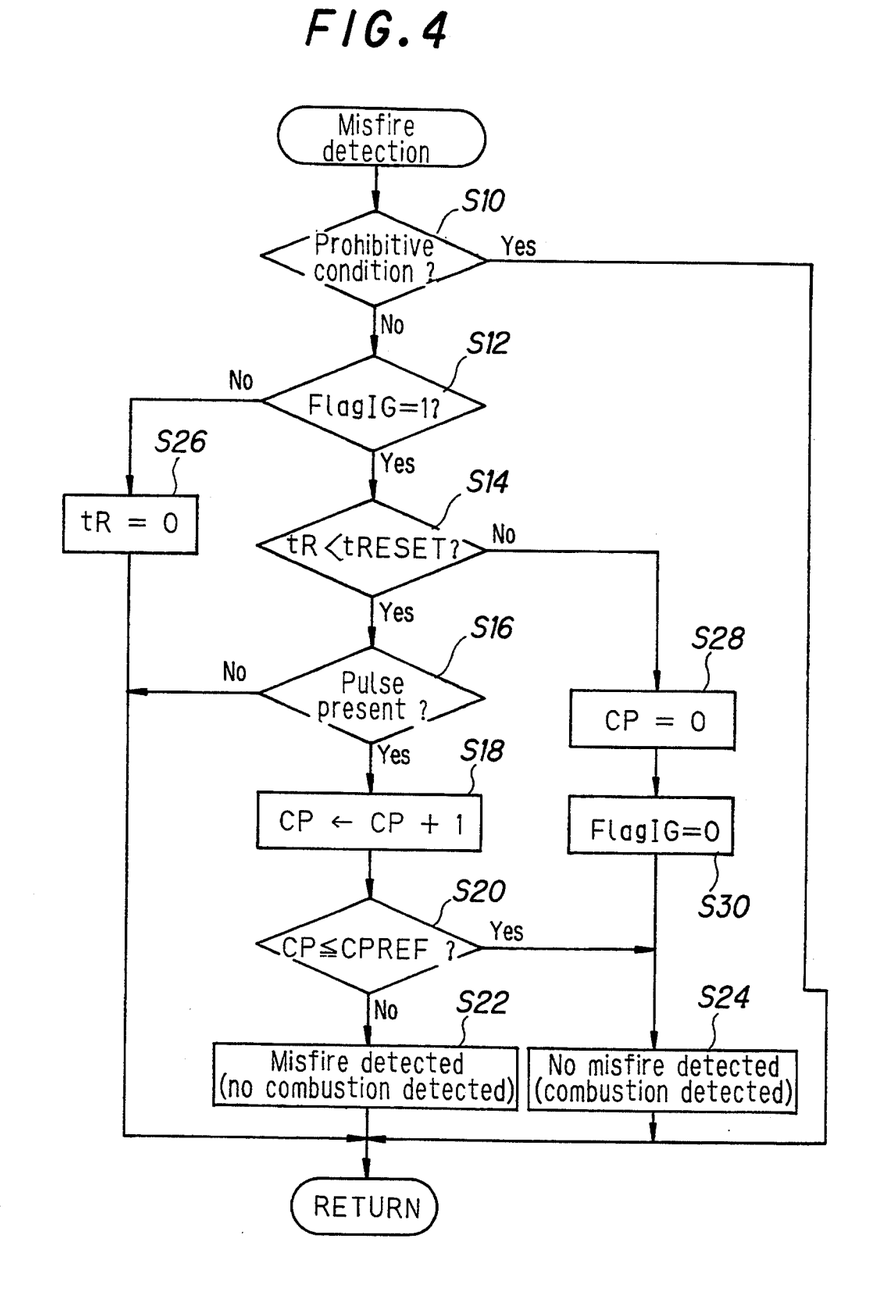
FIG. 4 is a flowchart showing the operation of the misfire detection system according to the invention.
Figure 7:
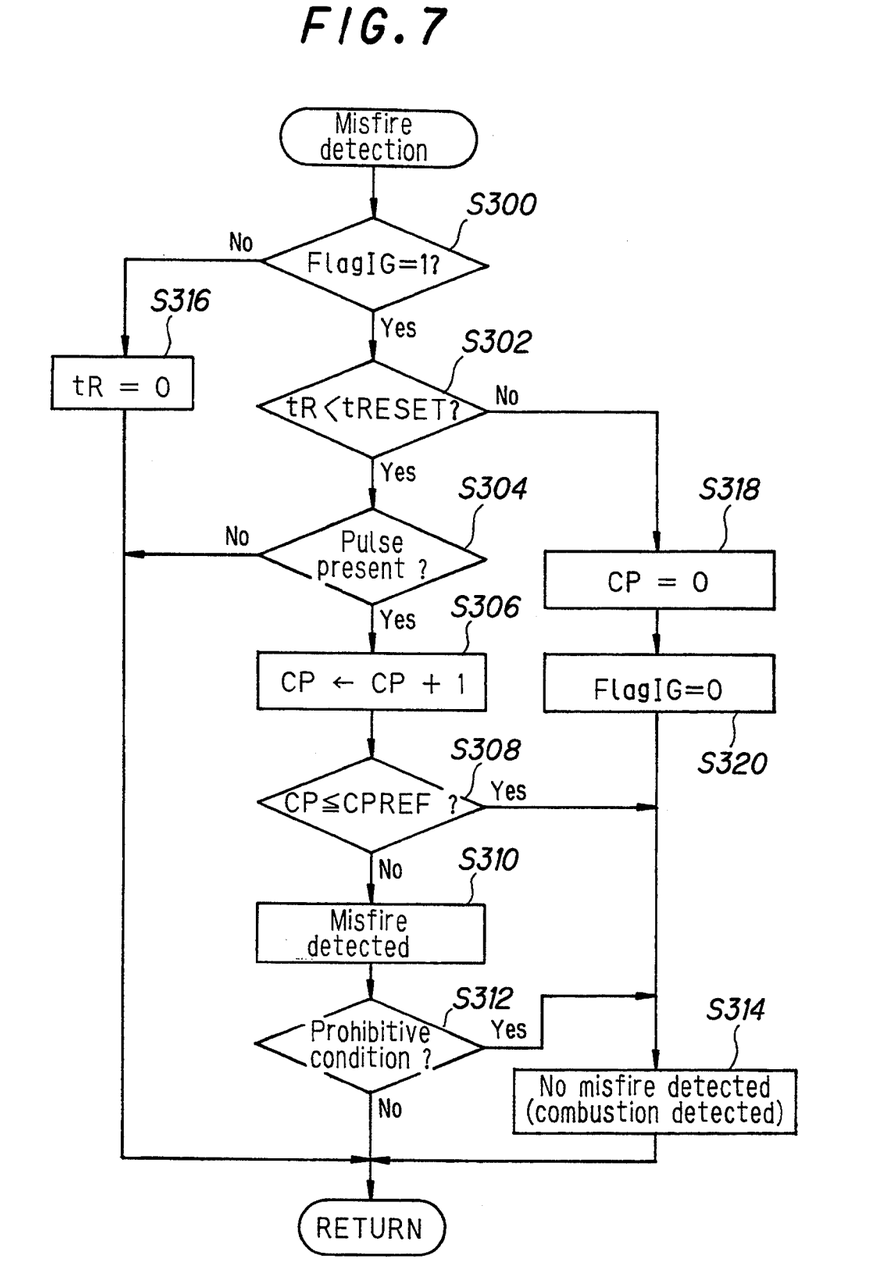
FIG. 7 is a flowchart, similar to FIG. 4, but showing the operation of the misfire detection system according to a second embodiment of the invention.

FIG. 7 is a flowchart similar to that of FIG. 4 relating to a second embodiment of the invention. In the second embodiment, after misfire detection is conducted in S308 and S310, the program passes to S312 in which a decision is made as to whether a prohibitive condition is in effect. If the condition is in effect, the program proceeds to S314 in which it is determined that misfire did not occur (combustion did occur). The effect achieved by this embodiment is the same as that of the first embodiment. The remaining steps are the same as those of the first embodiment.

Figure 8:
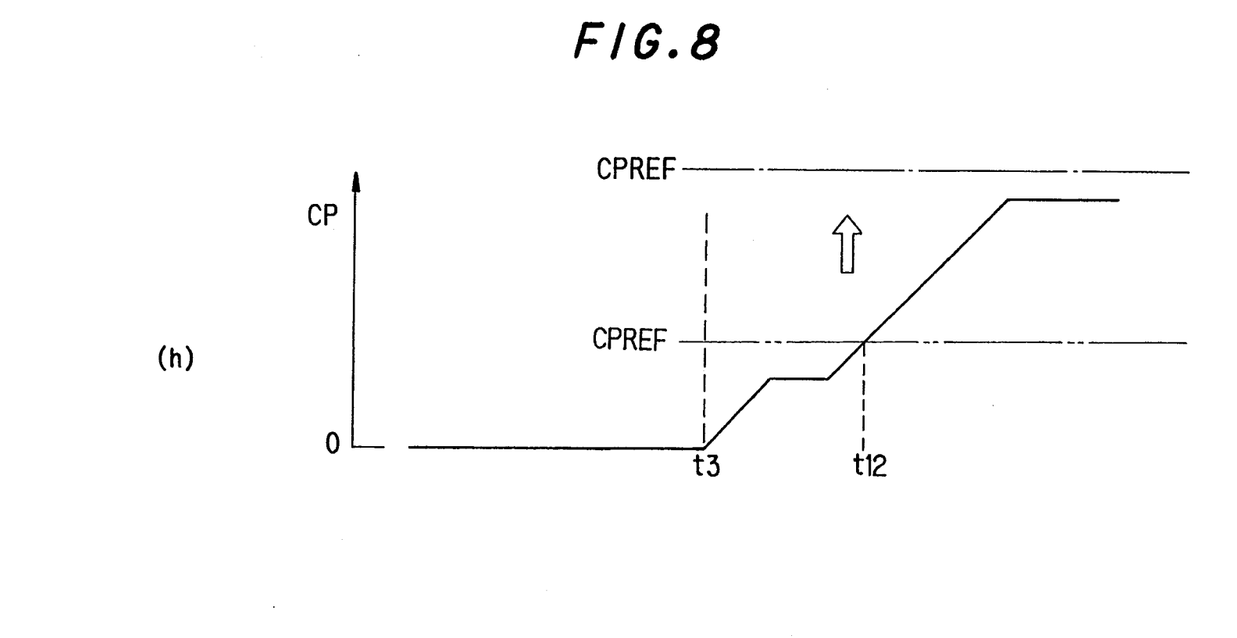
FIG. 8 is a timing chart, similar to a portion of FIG. 3, but showing the operation of the misfire detection system according to a third embodiment of the invention.

FIG. 8 is a timing chart similar to (h) in FIG. 3, and shows a third embodiment of the invention. In the third embodiment, the reference value CPREF is set higher than the maximum value expected from integrating the pulse CP (the reference value CPREF used in the first embodiment is indicated by a two-dot chain line). Since this eventually prevents a misfire detection from being made under the aforementioned condition in which the probability of vapor lock's occurrence is large, the effect of the third embodiment is the same that of the earlier embodiments.

Figure 9:
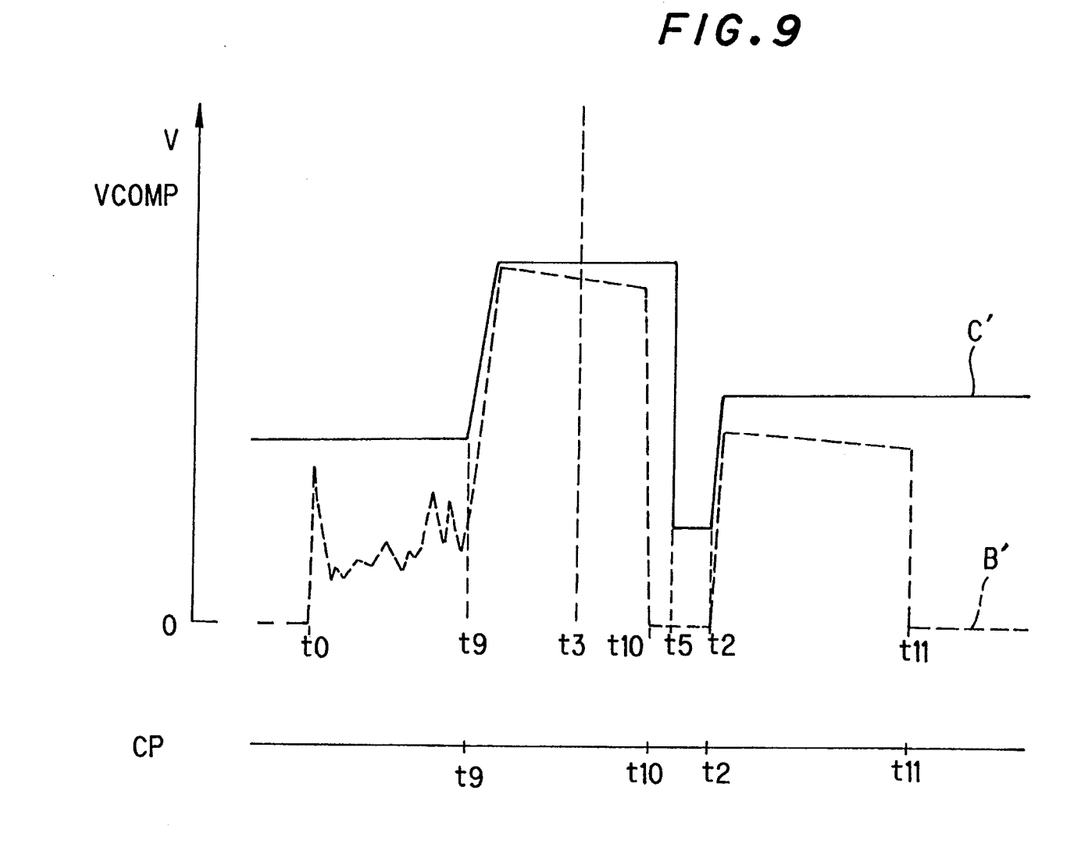
FIG. 9 is a timing chart, similar to a portion of FIG. 3, but showing the operation of the misfire detection system according to a fourth embodiment of the invention.

FIG. 9 is a timing chart similar to (f) and (g) in FIG. 3, and shows a fourth embodiment of the invention. In the fourth embodiment, the reference value VCOMP is set higher than the maximum value expected. Also, this eventually prevents the misfire detection from being made similar to the third embodiment.

From the third and fourth embodiments, it will be easily understood that the same purpose can be achieved by raising both the reference values CPREF and VCOMP higher than necessary.

While it is also possible to use various other techniques, such as masking the gate interval TG, the gist of the invention is that whatever technique is used it suffices to prevent a determination that a misfire occurred from being made at a condition in which vapor lock is apt to occur.

Although in the above-described embodiments misfire caused by a problem in the fuel supply system is detected by reapplying a voltage after the ignition command signal has been issued, the invention is not limited to this method and also encompasses other cases such as where misfire detection is conducted on the basis of change in engine speed, as described in Japanese Laid-Open Patent Publication 61(1986)-258955.

The present invention has thus been shown and described with reference to the specific embodiments. However, it should be noted that the present invention is in no way limited to the details of the described arrangements; changes and modifications may be made without departing from the scope of the appended claims.

What is claimed is:

1. A system for detecting misfire for an internal combustion engine, comprising;
    first means for detecting whether misfire has occurred in the engine;
    second means for detecting a pressure in a fuel tank provided in a vehicle on which the engine is mounted;
    third means for detecting a temperature of the fuel supplied to the engine;
    fourth means for presuming, on the basis of the detected in-fuel tank pressure and the fuel temperature, if the fuel is in a condition in which vapor lock would occur; and
    fifth means for inactivating the operation of said first means when the fuel is presumed to be in the condition.

2. A system according to claim 1, wherein said fifth means inactivates the operation of said first means by preventing said first means from detecting misfire.

3. A system according to claim 1, wherein said fifth means inactivates the operation of said first means by making said first means to detect no misfire when said first means determines occurrence of misfire.

4. A system according to claim 1, wherein said first means includes;

sixth means for reapplying, after applying an ignition voltage to a spark plug of the engine, a second voltage to the spark plug;

seventh means for detecting the second voltage applied to the spark plug; and eighth means for comparing the detected voltage with a reference voltage;

and said first means determines occurrence of misfire if the detected voltage is found to exceed the reference voltage.

5. A system according to claim 4, wherein said eighth means includes;

ninth means for producing a pulse every time the detected voltage exceeds a first reference value; and tenth means for counting the width of the pulse to compare it with a second reference value;

and said first means determines occurrence of misfire if the counted width of the pulse is found to exceed the second reference value.

6. A system according to claim 5, wherein said fifth means inactivates the operation of said first means by increasing the first reference value.

7. A system according to claim 5, wherein said fifth means inactivates the operation of said first means by increasing the second reference value.

8. A system according to claim 5, wherein said fifth means inactivates the operation of said first means by increasing both the first and second reference values.

9. A system according to claim 4, wherein said fifth means inactivates the operation of said first means by increasing the reference value.

* * * * *